United States Patent
Harada et al.

(10) Patent No.: US 9,261,131 B2
(45) Date of Patent: Feb. 16, 2016

(54) CRANKSHAFT STRUCTURE

(71) Applicant: HONDA MOTOR CO., LTD., Tokyo (JP)

(72) Inventors: Motoki Harada, Wako (JP); Tadashi Niino, Wako (JP); Mitsuyoshi Kamiya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/333,779

(22) Filed: Jul. 17, 2014

(65) Prior Publication Data
US 2015/0027272 A1    Jan. 29, 2015

(30) Foreign Application Priority Data
Jul. 23, 2013 (JP) .................................. 2013-152467

(51) Int. Cl.
| | |
|---|---|
| *F16C 3/06* | (2006.01) |
| *F16C 3/08* | (2006.01) |
| *F16C 3/14* | (2006.01) |
| *F16C 3/22* | (2006.01) |
| *F16C 3/20* | (2006.01) |

(52) U.S. Cl.
CPC ... *F16C 3/06* (2013.01); *F16C 3/08* (2013.01); *F16C 3/14* (2013.01); *F16C 3/20* (2013.01); *F16C 3/22* (2013.01); *F16C 2360/22* (2013.01); *Y10T 74/2183* (2015.01)

(58) Field of Classification Search
CPC ................ F16C 3/20; F16C 3/06; F16C 3/14; F16C 3/22; F16C 3/08; Y10T 74/2174; Y10T 74/2183; Y10T 29/49286
See application file for complete search history.

(56) References Cited

U.S. PATENT DOCUMENTS

| | | | | |
|---|---|---|---|---|
| 5,203,230 | A | * | 4/1993 | Distelrath ...................... 74/595 |
| 5,265,566 | A | * | 11/1993 | Arnold et al. .............. 123/197.4 |
| 2013/0098330 | A1 | | 4/2013 | Sigrist et al. |

FOREIGN PATENT DOCUMENTS

| | | |
|---|---|---|
| DE | 102011014310 | 9/2012 |
| JP | 04-262147 | 9/1992 |
| JP | 2000-320531 | 11/2000 |
| JP | 2006-57665 | 3/2006 |

\* cited by examiner

*Primary Examiner* — Thomas Diaz
(74) *Attorney, Agent, or Firm* — Rankin, Hill & Clark LLP

(57) ABSTRACT

A crankshaft structure includes a crank pin section, a crank journal section, and a counter weight section arranged between the crank pin section and the crank journal section in a direction of a crankshaft. A crank arm section connecting the crank pin section and the crank journal section is formed with each of lateral edge portions extending substantially along a circumscribed tangential line connecting a base of the crank pin section and a base of the crank journal section when viewed in the direction of the crankshaft. Each of the lateral edge portions of the crank arm section includes an edge groove having a length extending between a central axis of the crank pin section and a central axis of the crank journal section when viewed in a direction to cross the crankshaft. The edge groove has a groove bottom portion formed between two reinforcing ribs.

7 Claims, 7 Drawing Sheets

CRANKSHAFT STRUCTURE

BACKGROUND OF THE INVENTION

1. Field of the Invention

The present invention relates to a crankshaft structure which is reduced in weight.

2. Description of Related Art

A crankshaft structure in which a crank arm holding a crank pin section is formed with cutouts at both lateral edge portions thereof on each of the crank pin section side and a crank journal section side so as to be reduced in weight is disclosed in Japanese Patent Application Laid-Open Publication No. H04-262147, for instance. However, further weight reduction of a crankshaft while increasing strength and rigidity of the crankshaft is required.

BRIEF SUMMARY OF THE INVENTION

In view of the above prior art, the present invention has an objective of providing a crankshaft structure that is reduced in weight while making it possible to increase strength and rigidity of the crankshaft and that is improved in lubrication capacity thereof.

In order to achieve the above described object, according to a first feature of the present invention, there is provided a crankshaft structure comprising a crank pin section, a crank journal section, and a counter weight section arranged between the crank pin section and the crank journal section in the direction of a crankshaft, wherein a crank arm section connecting the crank pin section and the crank journal section is formed with each of lateral edge portions extending substantially along a circumscribed tangential line connecting a base of the crank pin section and a base of the crank journal section when viewed in the direction of the crankshaft, and each of the lateral edge portions of the crank arm section is provided with an edge groove having a length extending between a central axis of the crank pin section and a central axis of the crank journal section when viewed in a direction to cross the crankshaft.

According to the first feature of the present invention, the crank arm section can be greatly reduced in weight due to the edge grooves, and a movement of an oil mist with respect to the crank arm section is smoothly carried out between the central axis of the crank pin section and the central axis of the crank journal section whereby it is possible to contribute to an improvement in lubrication capacity of the crankshaft.

According to a second feature of the present invention, in a crankshaft structure as defined in the first feature, the edge groove has a groove bottom portion formed between two reinforcing ribs which constitute each of lateral portions of the edge groove and which open at least toward the central axis of the crank pin section.

According to the second feature of the present invention, in addition to the effect of the first feature, even if the edge grooves are provided, the supporting rigidity of the crank pin section can be increased by the reinforcing ribs, so that the crankshaft can be improved in strength and rigidity. Moreover, the flow of the oil mist which is introduced into the groove bottom portion by rotation of the crankshaft can be directed to the crank pin section whereby it is possible to improve the lubrication capacity of a connecting rod and a piston.

According to a third feature of the present invention, in a crankshaft structure as defined in the second feature, the edge groove is formed such that a part of the edge groove located on the central axis side of the crank pin section is inclined to approach the crank pin section in relation to a part thereof located on the central axis side of the crank journal section, when viewed in the direction to cross the crankshaft.

According to the third feature of the present invention, in addition to the effect of the second feature, the flow of the oil mist in the edge grooves is allowed to access the crank pin section more effectively.

According to a fourth feature of the present invention, in a crankshaft structure as defined in the third feature, a connecting portion of the crank arm section providing a connection between the crank journal section and the counter weight section is formed smaller in width than an interval between extension lines of the groove bottom portions located on each of the lateral edges of the crank arm section when viewed in the direction of the crankshaft, and each of the reinforcing ribs constituting each of the lateral portions of the edge groove has such a configuration as to open toward the counter weight section.

According to the fourth feature of the present invention, in addition to the effect of the third feature, since the groove bottom portion of the edge groove is open at each end, the flow of the oil mist in the groove bottom portion during operation can be accelerated, and, during stopping, the oil mist can be restrained from staying in the groove bottom portion whereby to prevent the burning of the oil.

According to a fifth feature of the present invention, in a crankshaft structure as defined in the fourth feature, the two reinforcing ribs constituting each of the lateral portions of the edge groove are formed such that the rib on the side of the crank pin section is lower in height than that on the side of the crank journal section.

According to the fifth feature of the present invention, in addition to the effect of the fourth feature, the flow of the oil mist in the edge grooves is allowed to access the crank pin section more effectively.

According to a sixth feature of the present invention, in a crankshaft structure as defined in the fourth or fifth feature, protruding ribs are formed on the connecting portion to extend in each of lateral directions when viewed in the direction of the crankshaft, and an interval between distal ends of the protruding ribs is smaller in width than the interval between the extension lines of the groove bottom portions located on each of the lateral edges of the crank arm section.

According to the sixth feature of the present invention, in addition to the effect of the fourth or fifth feature, the crank arm section can be reduced in weight and the balance between the weight reduction and the rigidity with respect to the crank arm section can be optimized. In addition, the turbulence of the oil mist can be prevented thereby to improve the lubrication capacity.

DETAILED DESCRIPTION OF THE INVENTION

Figure 1:
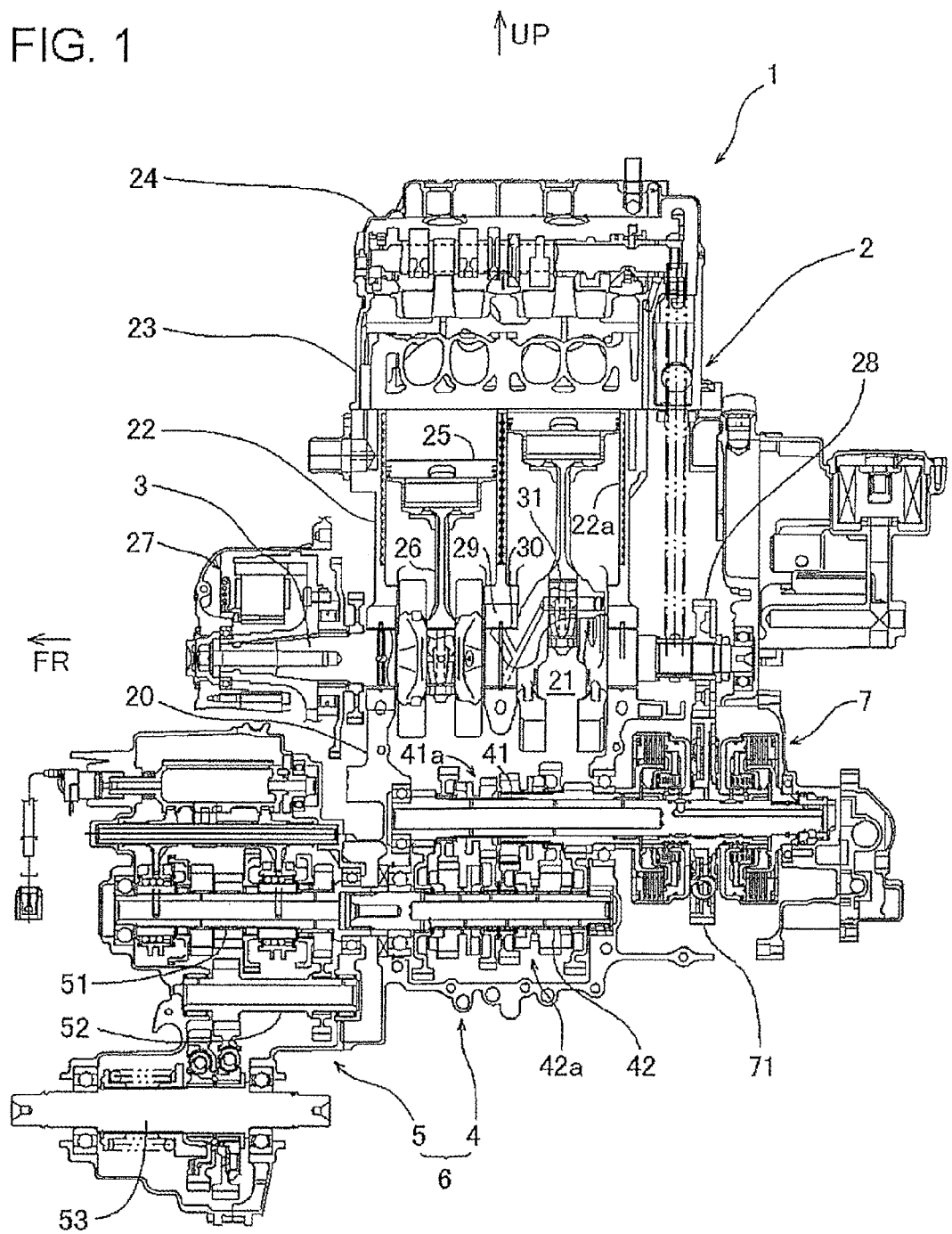
FIG. 1 is a cross sectional elevation view of a power unit equipped with a crankshaft structure in accordance with an embodiment of the present invention.

FIG. 1 is a developed view in vertical cross section of a power unit equipped with a crankshaft structure in accordance with an embodiment of the present invention. In the following description, the orientation such as "front", "rear", "upper", "lower" and the like shall be determined based on the orientation of a vehicle such as all terrain vehicle (not shown in the drawing) on which a power unit 1 according to this embodiment is mounted in the position as shown in FIG. 1. In FIG. 1, an upper side of the drawing is an upper side of the vehicle and a left side of the drawing is a forward side of the vehicle.

The power unit 1 is mounted on the vehicle with a crankshaft 3 of an internal combustion engine 1 extending in a forward and backward direction of the vehicle. An output shaft 53 (a speed change driven shaft) of the power unit 1 projects in front and in the rear. The rotational motive power of the output shaft 53 is transmitted through a front drive shaft and a front differential gear (each of which is not shown in the drawing) from a front end of the output shaft 53 to left and right front wheels. At the same time, it is transmitted through a rear drive shaft and a rear differential gear (each of which is not shown in the drawing) from a rear end of the output shaft 53 to left and right rear wheels.

In the power unit 1, a primary transmission 4 and a secondary transmission 5 are combined with the in-line, two-cylinder, water-cooled four stroke cycle internal combustion engine 2 thereby to form a power transmission device 6.

The power unit 1 is mounted on the vehicle in the so-called longitudinally mounted condition where the crankshaft 3 of the internal combustion engine 2 extends in the forward and backward direction of the vehicle.

The power unit 1 is formed with a cylinder block 22 located above a crank case 20 on which the crankshaft 3 of the internal combustion engine 2 is pivotally supported. A cylinder head 23 and a cylinder head cover 24 are placed on the cylinder block 22 in order and project upwardly.

The crank case 20 extends in the right direction to form a primary transmission case for accommodating the primary transmission 4. The primary transmission 4 is located on the right side of the crankshaft 3 of the internal combustion engine 2 (illustrated on the lower side since FIG. 1 is a developed view), and the secondary transmission 5 projects forwardly in substantially an overlapping condition with a front side of the primary transmission 4.

In the cylinder block 22 of the internal combustion engine 2, two cylinder bores 22a are arranged forwardly and backwardly in line. Pistons 25 reciprocating within the cylinder bores 22a are connected by connecting rods 26 to the crankshaft 3 within a crank chamber 21 defined by the crank case 20, whereby the reciprocating motion of the pistons 25 is converted to the rotation thereby to be outputted.

An A. C. generator 27 is provided on a front end portion of the crankshaft 3 extending in the forward and backward direction, and a primary drive gear 28 is engaged and attached to a rear end portion of the crankshaft 3.

A clutch device 7 is arranged on and coaxial with a rear end portion of a main shaft 41 of the primary transmission 4 which extends in parallel with the crankshaft 3. A primary driven gear 71 of the clutch device 7 is arranged to mesh with the primary drive gear 28 whereby the rotational motive power of the crankshaft 3 is transmitted.

Although the main shaft 41 is shown below the crankshaft 3 in FIG. 1 since FIG. 1 is the developed view, the main shaft 41 is located on substantially the right side (the other side of the drawing) of the crankshaft 3 in this embodiment.

On the main shaft 41 of the primary transmission 4 there are provided six drive speed change gears 41a, and on a counter shaft 42 there are provided six driven speed change gears 42a which correspond to and are in constantly meshing engagement with these drive speed change gears 41a.

Between the drive speed change gears 41a and the driven speed change gears 42a, the meshing engagement of gears to transmit the motive power is selectively shifted by a gear shift device (not shown) so as to carry out the speed change. However, the clutch device 7 is configured not to transmit the rotational motive power of the crankshaft 3 to the primary transmission 4 during shifting of the gears of the primary transmission 4 and, as soon as the gear shift of the primary transmission 4 is completed, to transmit the rotational motive power of the crankshaft 3 to the primary transmission 4.

The counter shaft 42 is an output shaft of the primary transmission 4. A front end portion of the counter shaft 42 extends forwardly of the crank case 20 and is connected to a speed change drive shaft 51 of the secondary transmission 5 which is arranged on the forward side of the crank case 20. The rotational motive power transmitted to the speed change drive shaft 51 is transmitted through an intermediate gear shaft 52 to the speed change driven shaft 53 serving as the output shaft 53 of the secondary transmission 5 and also serving as the output shaft 53 of the power unit 1. During the transmission, the speed change and the shift between forward movement and backward movement are carried out.

Figure 2:
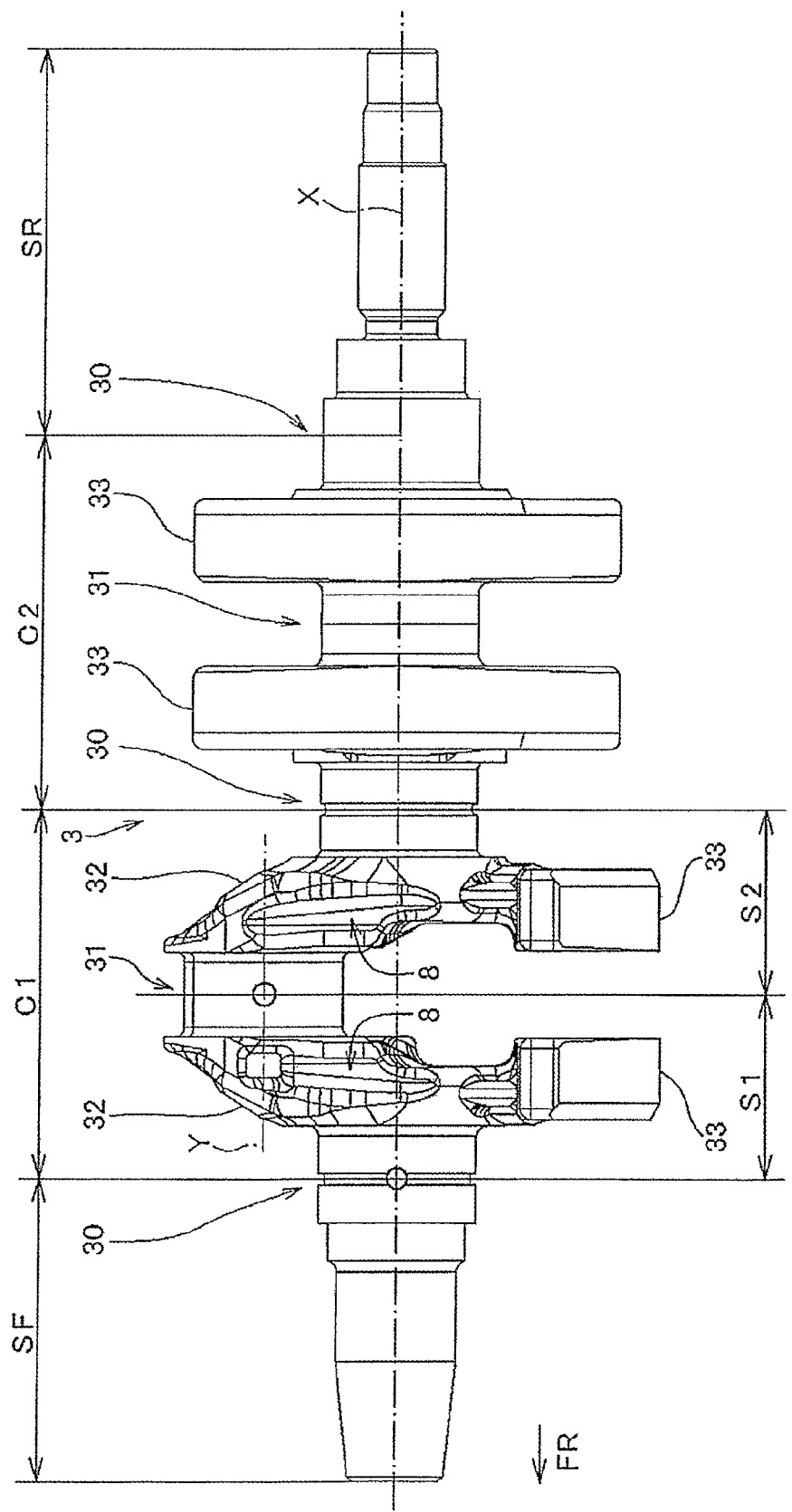
FIG. 2 is an elevation view of a crankshaft taken out from FIG. 1.

FIG. 2 shows the crankshaft 3 removed from the power unit 1.

In FIG. 1, the crank pin section 31 on the forward side is shown in a forward position of the drawing and the crank pin section 31 on the backward side is shown in an upper position of the drawing. However, in FIG. 2, in a condition to be rotated 90° about a crankshaft axis X from a condition of FIG. 1, the crank pin section 31 on the forward side is shown in the upper position of the drawing, and the crank pin section 31 on the backward side is shown on the other side of the drawing.

Namely, the crankshaft 3 of this embodiment is for two cylinders, and, in conformity to two cylinder bores 22a (see FIG. 1), includes in order from the forward direction a forward shaft end part SF, a first crank part C1, a second crank part C2 and a backward shaft end part SR as shown in FIG. 2, which are formed integral with each other as a whole. The first crank part C1 and the second crank part C2 have crank pins different in phase at an angle of 270° and are of the same shape.

Further, in the first crank part C1, a first section S1 and a second section S2 as shown in FIG. 2 are integrally formed forwardly and backwardly on either side of the crank pin section 31. The second crank part C2 is formed in a similar configuration.

The crankshaft 3 includes three crank journal sections 30 forming main rotational shafts around the crankshaft axis X of the crankshaft 3, two crank pin sections 31 on which the lower ends of the connecting rods 26 are pivotally attached, crank arm sections 32 connecting each of the crank journal sections 30 and each of the crank pin sections 31, and counter weight sections 33 connected continuously to each of the crank arm sections 32.

In addition, the crankshaft 3 is formed by a forging process (a hot forging process), for instance.

The crank journal section 30 is a section of a cylindrical shape which forms the main rotational shaft of the crankshaft 3. Each of the crank journal sections 30 is pivotally supported on a support portion 29 (in more detail, on a metal bearing provided on a distal end of the support portion 29) in a rotatable fashion (see FIG. 1).

The crank pin section 31 is a section of a cylindrical shape which is configured to pivotally support the lower end of the connecting rod 26 in a slidable fashion. Each of the crank pin sections 31 are supported by the crank journal section 30 through the pair of crank arm sections 32 located forwardly and backwardly on either side thereof.

In this embodiment, the two crank pin sections 31 are arranged between the three crank journal sections 30.

The crank arm section 32 is a section of a wall shape which provides a connection between the crank journal section 30 and the crank pin section 31 and which is provided on either side of the crank pin section 31 in the direction of the crankshaft axis X. The counter weight section 33 is extended from each of the crank arm sections 32 in an opposite direction of the crank pin section 31 with respect to the crankshaft axis X.

The counter weight section 33 is a section which is balanced in weight with respect to the crank pin section 31 and the crank arm section 32.

In the crankshaft 3 of this embodiment, since the first crank part C1 and the second crank part C2 have crank pins different in phase at an angle of 270°, not only the counter weight sections 33, but also a balancer device not shown in FIG. 1, are provided in the crank case 20 so as to be rotationally driven in synchronization with the crankshaft 3.

Figure 3:
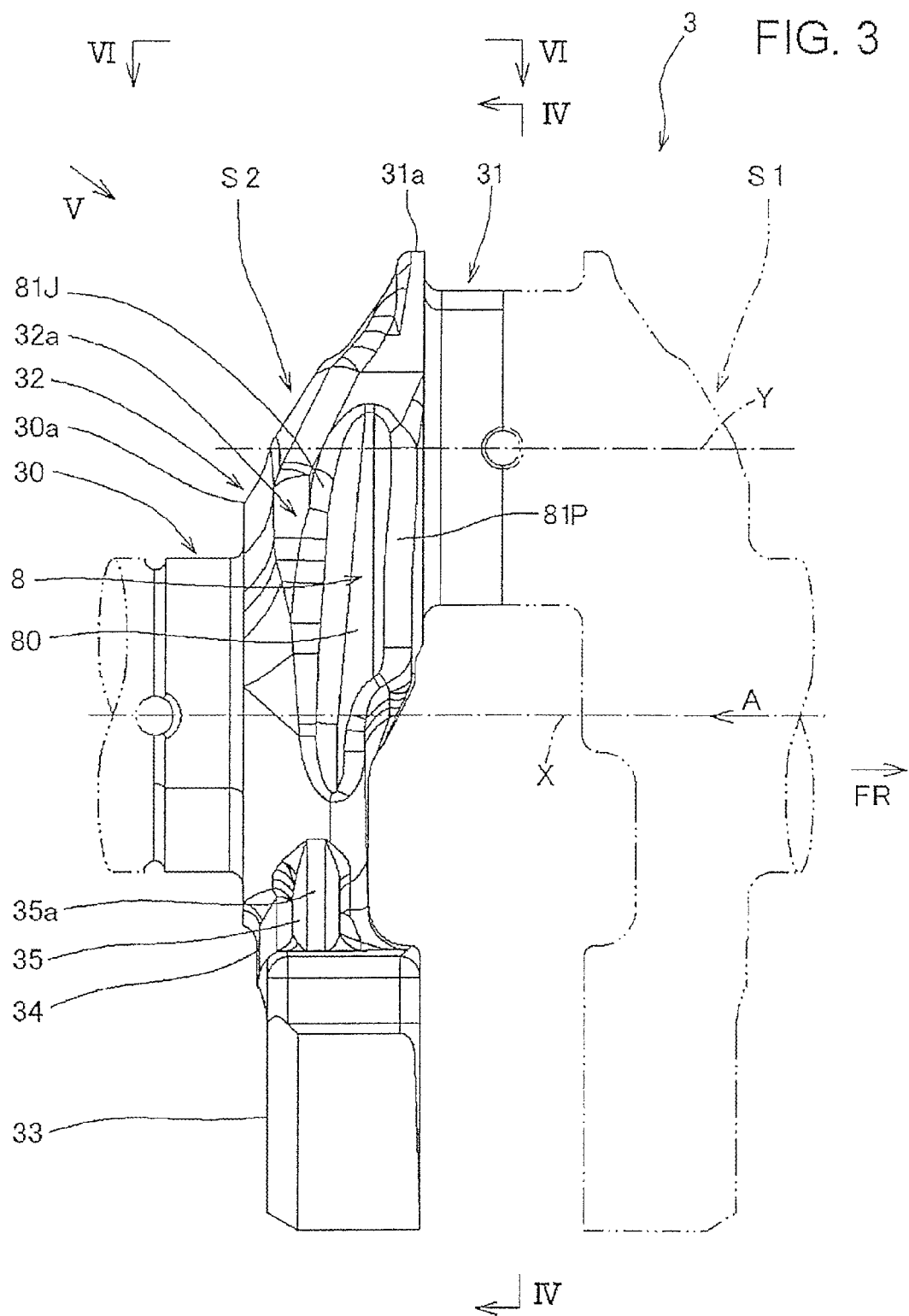
FIG. 3 is a fragmentary elevation view of a portion of the crankshaft of FIG. 2, that is, a second section of a first crank part, of which a forward and backward direction (a left and right direction in the drawing) is shown in a reversed condition with respect to FIG. 2.
Figure 4:
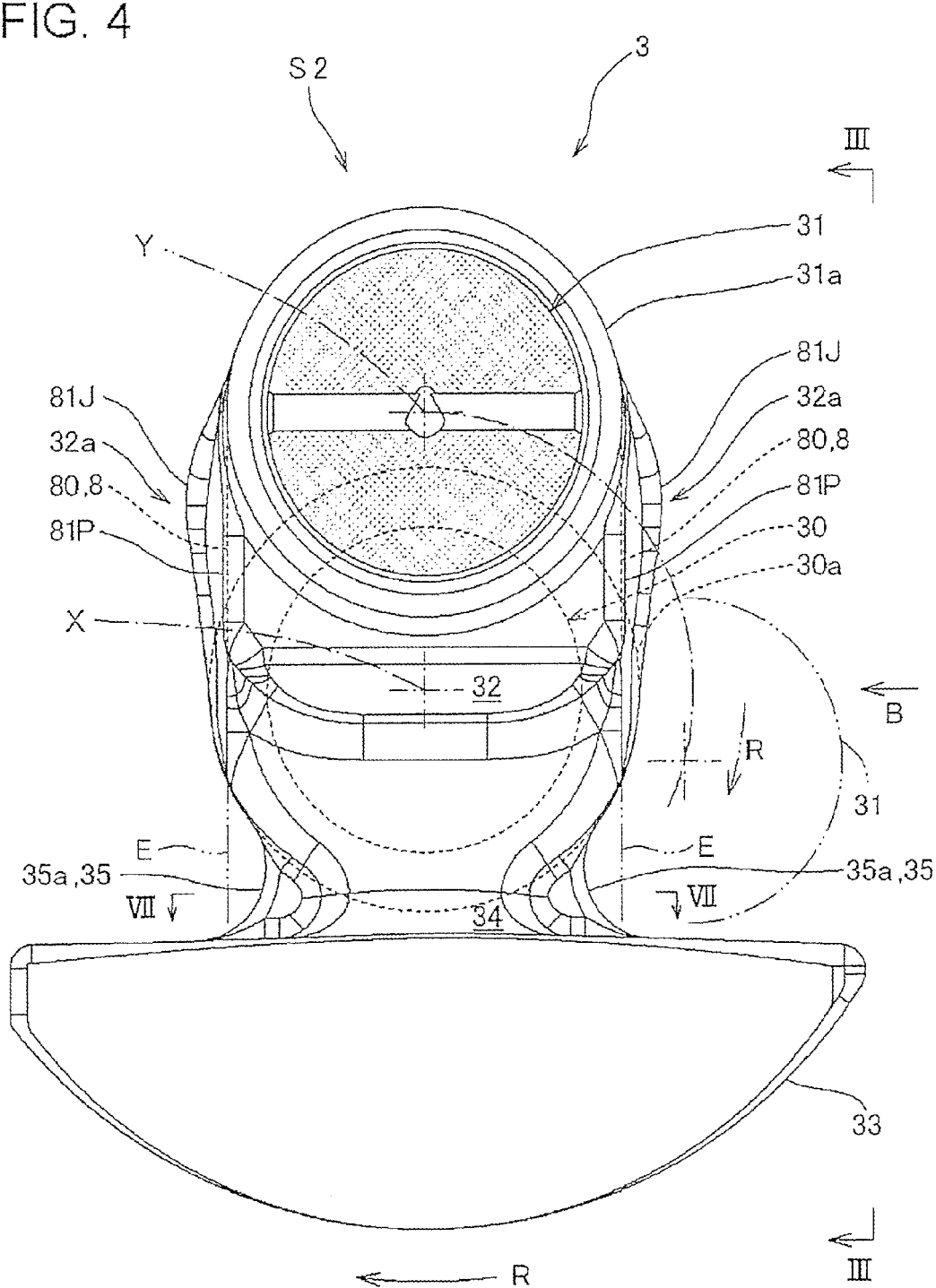
FIG. 4 is a front elevation view of the second section as seen in the direction of the arrowed line IV-IV of FIG. 3.
Figure 5:
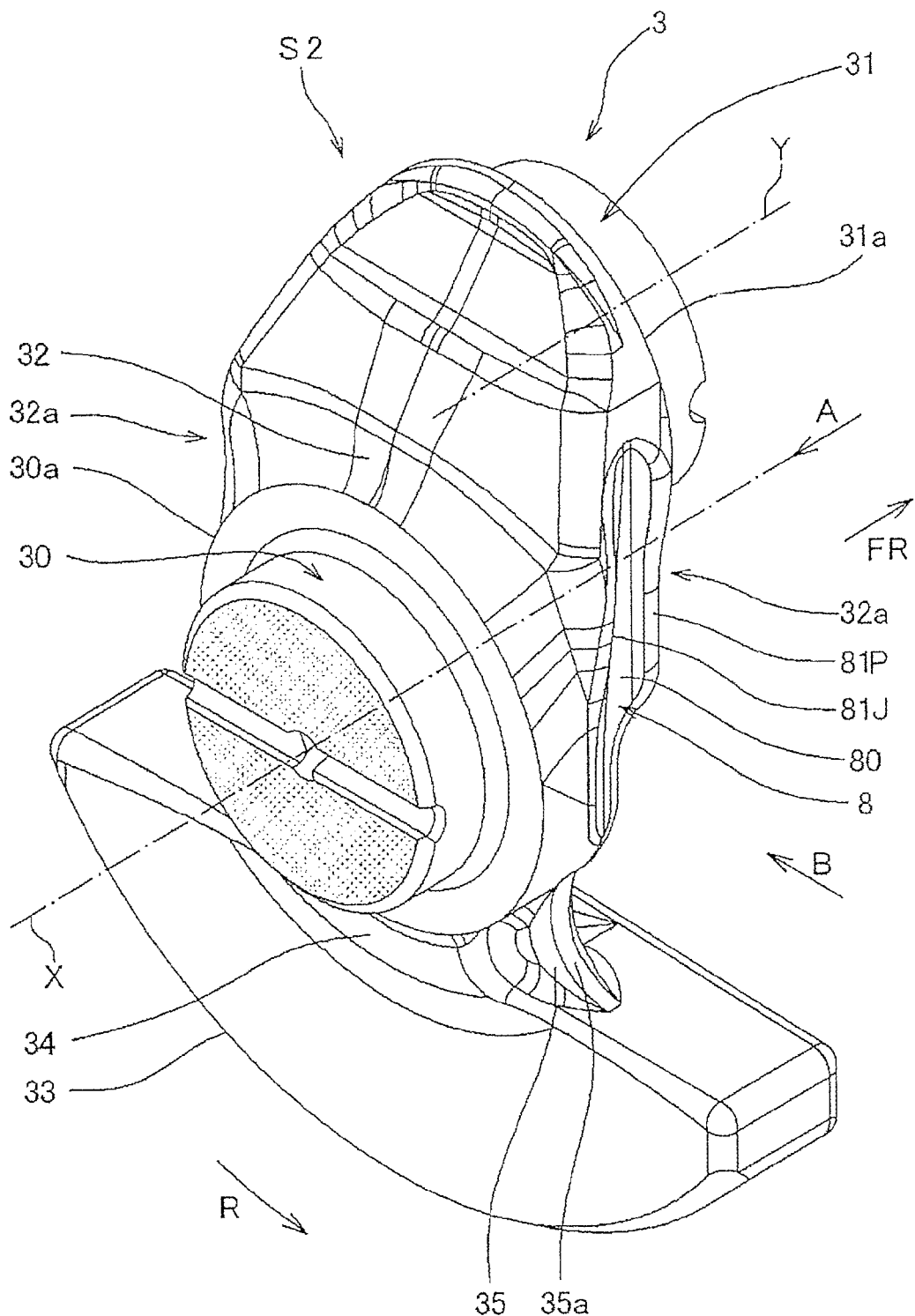
FIG. 5 is a perspective view of the second section as seen in the direction of the arrow V of FIG. 3.
Figure 6:
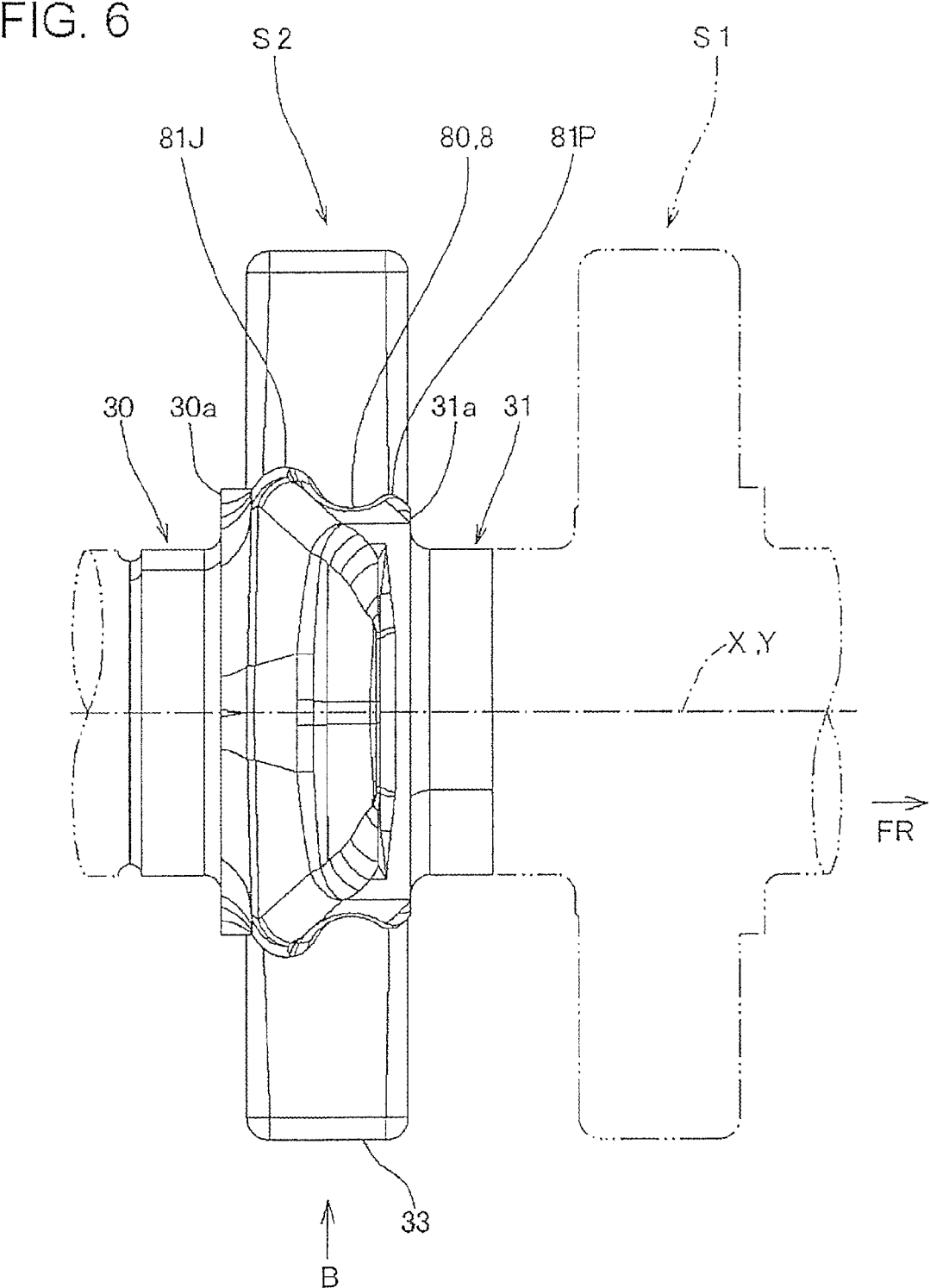
FIG. 6 is a plan view of the second section as seen in the direction of the arrowed line VI-VI of FIG. 3.

FIG. 3 is a fragmentary side view of a portion of the crankshaft of FIG. 2, that is, the second section S2 of the first crank part C1, of which the forward and backward direction (the left and right direction in the drawing) is shown in a reversed condition with respect to FIG. 2. FIG. 4 is a front view of the second section S2 as seen in the direction of the arrowed line IV-IV of FIG. 3. FIG. 5 is a perspective view of the second section S2 as seen in the direction of the arrow V of FIG. 3. FIG. 6 is a top plan view of the second section S2 as seen in the direction of the arrowed line VI-VI of FIG. 3. Although these FIGS. show only the second section S2 in a state of having been cut out from FIG. 2, the second section S2 is a portion of the crankshaft 3 integrally formed therein as explained above.

As shown in FIG. 3, in the crankshaft structure of this embodiment, the crank arm section 32 is provided between the crank pin section 31 and the crank journal section 30 in the direction of the crankshaft axis X and provides a connection between the crank pin section 31 and the crank journal section 30.

In addition, the second section S2 includes each of halves of the crank pin section 31 and the crank journal section 30 in the direction of the crankshaft axis X.

Further, the counter weight section 33 is extended from the crank arm section 32 in an opposite direction of the crank pin section 31 with respect to the crankshaft axis X.

As shown in FIG. 4, the crank arm section 32 which connects the crank pin section 31 and the crank journal section 30 is configured to allow each of lateral edges 32a thereof to extend substantially along a circumscribed tangential line connecting a base 31a of the crank pin section 31 and a base 30a of the crank journal section 30 when viewed in the direction of the crankshaft axis X (in the direction of an arrow A in FIGS. 3 and 5: "when viewed in the direction of the crankshaft" according to the present invention).

As shown in FIG. 3, each of the lateral edges 32a of the crank arm section 32 is provided with an edge groove 8 having a length extending between a central axis Y of the crank pin section 31 and a central axis of the crank journal section 30, that is, the crankshaft axis X when viewed in a direction of an arrow B to cross the crankshaft axis X (in the direction of the arrow B in FIGS. 4 to 6: "when viewed in a direction to cross the crankshaft" according to the present invention).

Thus, since the edge groove 8 is provided on the crank arm section 32, the crank arm section 32 is greatly reduced in weight.

Moreover, although, during operation of the internal combustion engine 2, the crankshaft 3 is rotated within the crank chamber 21 defined by the crank case 20, and the oil mist which is splashed from a lubricating oil feeding place and floats within the crank chamber 21 is caught by the crank arm section 32 of the crankshaft 3, the movement of the oil mist between a center Y side of the crank pin section 31 and a center X side of the crank journal section 30 is smoothly carried out, to contribute to feeding of the lubricating oil into the crank pin section 31 and the crank journal section 30.

On each of lateral portions of the edge groove 8, there are formed two reinforcing ribs. That is, a reinforcing rib 81J on the side of crank journal section 30 and a reinforcing rib 81P on the side of the crank pin section 31 are provided so that the crank arm section 32 is increased in strength and rigidity.

Accordingly, the supporting rigidity of the crank pin section 31 is improved by the couple of reinforcing ribs 81J, 81P. Thus, in cooperation with the edge groove 8, the crankshaft 3 can be increased in strength while controlling an increase in weight.

Particularly, in the case where the crank pins have a difference in phase at an angle of 270°, even if the counter weight section 33 is provided on the crankshaft 3, the balance is not able to be obtained only by the provision of the counter weight section 33, and so the balancer device (not shown) is provided in the crank case 20. As a consequence, the sufficient strength and rigidity are required for the crankshaft 3 so as to endure a load on the crankshaft 3, and this is a factor of an increase in axle weight. However, the weight reduction and the improvement of the strength and rigidity by the edge groove 8 and the reinforcing ribs 81J, 81P are effective countermeasures.

Further, a bottom groove portion 80 of the edge groove 8 is formed between the reinforcing ribs 81J and 81P, and both of the reinforcing ribs 81J, 81P are open at the side of the central axis Y of the crank pin section 31 without being connected to each other, so that the groove bottom portion 80 of the edge groove 8 is configured to be open at the side of the central axis Y of the crank pin section 31.

Accordingly, the oil mist which is collected to the crank arm section 32 as above in the wake of the rotation of the crankshaft 3 and introduced into the groove bottom portion 80 of the edge groove 8 is able to flow easily from the groove bottom portion 80 which is open at the side of the central axis Y of the crank pin section 31, toward the crank pin section 31, whereby the lubrication capacity of the connecting rod 26 and the piston 25 can be improved.

In addition, since the groove bottom portion 80 is formed in a planar shape at the time of forging and is usable as a working reference plane, it is possible to reduce the conventional working reference plane.

Furthermore, the edge groove 8 is narrowed in width gradually in the direction of the central axis Y of the crank pin section 31, and so the couple of reinforcing ribs 81J, 81P are arranged effectively in accordance with variation in thickness of the crank arm section 32 in the direction of the crankshaft axis X.

Further, the edge groove 8 is arranged close to the crankshaft axis X and exerts less influence upon the balance of the crankshaft 3 itself. Therefore, it is maintained without much influence upon the moment of inertia even if there is a reduction in thickness by the edge groove 8.

As shown in FIG. 3, the edge groove 8 is formed such that a part of the edge groove 8 on the central axis Y side of the crank pin section 31 is inclined to approach the crank pin section 31 in relation to a part thereof on the central axis X side of the crank journal section 30, when viewed in the direction of the arrow B to cross the crankshaft axis X (see FIGS. 4 to 6). By virtue of this configuration, the flow of the oil mist in the edge groove 8 is allowed to access the crank pin section 31 more effectively.

As shown in FIG. 6, both of the reinforcing ribs 81J, 81P constituting each of the lateral portions of the edge groove 8 are formed such that the reinforcing rib 81P located on the side of the crank pin section 31 is lower in height than the reinforcing rib 81J located on the side of the crank journal section 30. With this construction, the flow of the oil mist in the edge groove 8 is also allowed to access the crank pin section 31 more effectively.

With reference to FIGS. 3 and 5, the reinforcing rib 81J on the side of the crank journal section 30 and the reinforcing rib 81P on the side of the crank pin 31, each of which constitutes the lateral portion of the edge groove 8, are open at the side of the counter weight section 33 without being connected to each other. Therefore, the groove bottom portion 80 of the edge groove 8 is configured to be open at the side of the counter weight 33.

Moreover, as shown in FIG. 4, the connecting section 34 for providing the connection between the crank journal section 30 of the crank arm section 32 and the counter weight section 33 is formed smaller in width than an interval between extension lines E of the groove bottom portions 80 located on each of the lateral edges 32a of the crank arm section 32 when viewed in the direction of the crankshaft axis X as indicated by the arrow A.

Therefore, each of the groove bottom portions of the edge groove 8 is open also at the side of the counter weight section 33. The groove bottom portion 80 is open at both ends located not only on the side of the counter weight section 33 but also on the side of the central axis Y of the crank pin section 31. Accordingly, during operation of the internal combustion engine 2, the flow of the oil mist in the groove bottom portion 80 is accelerated and the feeding of the oil mist collected in the groove bottom portion 80 is facilitated smoothly. While the internal combustion engine 2 is stopped, the collected oil mist flows easily out of both ends of the groove bottom portion 80 and is restrained from staying in the groove bottom portion 80, whereby it is possible to prevent the burning of the oil by the remaining heat of the crankshaft 3.

Further, in the connecting section 34 for connecting the crank arm section 32 and the counter weight section 33 there are provided a paddle shaped protruding ribs 35 which extend in each of lateral directions and which are configured to provide a connection between the crank arm section 32 and the counter weight section 33, when viewed in the direction of the crankshaft axis X as indicated by the arrow A (see FIG. 5). An interval between distal ends 35a of the protruding ribs 35 located forwardly and backwardly in a rotational direction R is configured to be smaller in width than the interval between the extension lines E of the groove bottom portions 80 located in each of lateral edges 32a of the crank arm section 32.

Therefore, by the protruding ribs 35, the flow of the oil mist on the groove bottom portions 80 is not obstructed and the balance between the weight reduction and the rigidity is optimized. In addition, with provision of the protruding ribs 35, the lubrication capacity of the crank pin section 31 is improved.

Figure 7:
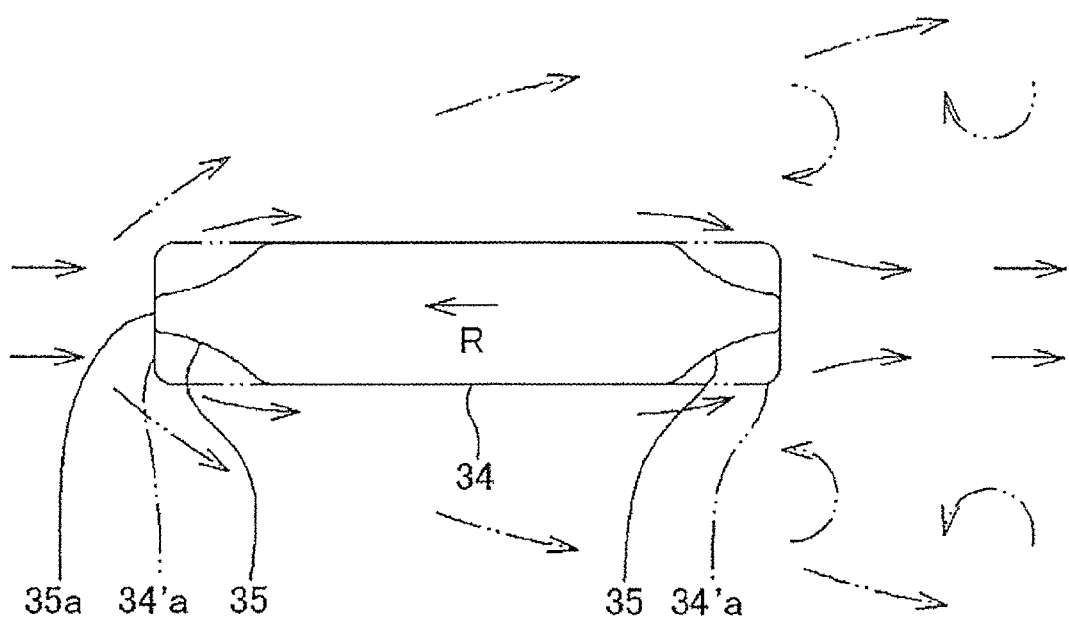
FIG. 7 is a schematic cross sectional view of a connecting section and a protruding rib, corresponding to a view as seen in the direction of the arrowed line VII-VII of FIG. 4.

FIG. 7 is a schematic cross sectional view of the connecting sections 34 and the protruding ribs 35 corresponding to a view as seen in the direction of the arrowed line VII-VII of FIG. 4.

When the crankshaft 3 is rotated in the crank chamber 21 of the crank case 20 (see FIG. 1), as shown by an arrow R in FIG. 4, the crank arm section 32, the counter weight section 33 and the connecting section 34 are rotated about the crankshaft axis X and move forward in such a way as to push the splashed and floating oil mist aside.

At that time, as seen in FIG. 7, the connecting section 34 moves forward in accordance with the rotation in the direction of the arrow R, the oil mist flows relatively in the directions of arrows indicated in FIG. 7.

Therefore, in the case of this embodiment, since the paddle shaped protruding ribs 35 are formed in front of and in the rear of the rotational direction R of the connecting section 34, the oil mist flows relatively and passes smoothly through the periphery of the connecting section 34 as indicated by solid line arrows in FIG. 7 by virtue of the protruding ribs 35, whereby it is possible to reduce turbulence of the oil mist after the connecting section 34 has passed.

However, if the connecting portion 34 is provided with ends 34'a of generally rectangular cross section in the rotational direction as indicated by a tow-dot chain line without the protruding ribs 35 as shown in this embodiment and, the relative flow of the oil mist, as indicated by arrows of two-dot chain line, is separated at the end 34'a in the rotational direction and thereafter the oil mist flows turbulently in a whirlpool shape and is prone to flow in a dispersed direction.

As shown in FIG. 4, when the connecting section 34 is rotated about the crankshaft axis X in the R direction, the crank pin section 31 is rotated about the crankshaft axis X to occupy the position as shown by a tow-dot chain line in FIG. 4 from which the connecting section 34 has passed. However, if the connecting section 34 is provided with the ends of generally rectangular cross section in the rotational direction as shown in FIG. 7, the oil mist is dispersed away from the position whereby the crank pin section 31 has difficulty in catching and collecting the sufficient oil mist.

However, in the case of this embodiment provided with the protruding ribs 35, since the oil mist in the position from which the connecting section 34 has moved is reduced in turbulence and stays in that position, the crank pin section 31 passing there is able to catch and collect the oil mist sufficiently whereby to improve the lubrication capacity.

With respect to the first section S1 (see FIG. 2) of the first crank part C1 of the crankshaft 3, which is connected to the above explained second section S2, the features explained above with respect to the second section S2 are basically similarly applicable to the first section S1 although there is a partial difference in shape, and these features also are similarly applicable to the second crank part C2 (see FIG. 2).

The features of the crankshaft structure of the above explained embodiment will be summarized again hereunder.

Namely, the crankshaft structure comprises the crank pin section 31, the crank journal section 30, and the counter weight section 33 arranged between the crank pin section 31 and the crank journal section 30 in the direction of the crankshaft axis X, wherein the crank arm section 32 connecting the crank pin section 31 and the crank journal section 30 is formed with each of lateral edges 32a extending substantially along the circumscribed tangential line connecting the base 31a of the crank pin section 31 and the base 30a of the crank journal section 30 when viewed in the direction of the crankshaft axis X as indicated by the arrow A, and each of the lateral edge portions 32a of the crank arm section 32 is provided with the edge groove 8 having the length extending between the central axis Y of the crank pin section 31 and the central axis X of the crank journal section 30 when viewed in the direction of the arrow B to cross the crankshaft axis X.

Therefore, the crank arm section 32 can be greatly reduced in weight due to the edge grooves 8, and the movement of the oil mist is smoothly carried out between the central axis Y of the crank pin section 31 and the central axis X of the crank journal section 30 in the crank arm section 32 whereby it is possible to contribute to the improvement in lubrication capacity of the crankshaft 3.

Further, since the edge groove 8 has the groove bottom portion 80 formed between the two reinforcing ribs 81J, 81P, which constitute each of lateral portions of the edge groove 8 and which open at least toward the central axis X of the crank pin section 31, even if the edge grooves 8 are provided, the supporting rigidity of the crank pin section 31 can be increased by the reinforcing ribs 81J, 81P, so that the crankshaft 3 can be improved in strength and rigidity. Moreover, the flow of the oil mist which is introduced into the groove bottom portion 80 by rotation of the crankshaft 3 can be directed to the crank pin section 31 whereby it is possible to improve the lubrication capacity of the connecting rod 26 and the piston 25.

Further, since the edge groove 8 is formed such that the part of the edge groove 8 located on the side of the central axis Y of the crank pin section 31 is inclined to approach the crank pin section 31 in relation to the part thereof located on the side of the central axis X of the crank journal section 30, when viewed in the direction of the arrow B to cross the crankshaft axis X, the flow of the oil mist in the edge grooves 8 is allowed to access the crank pin section 31 more effectively.

Further, the connecting portion 34 of the crank arm section 32 providing a connection between the crank journal section 30 and the counter weight section 33 is formed smaller in width than the interval between the extension lines E of the groove bottom portions 80 located on each of the lateral edges 32a of the crank arm section 32 when viewed in the direction of the crankshaft axis X indicated by the arrow A, and each of the reinforcing ribs 81J, 81P constituting each of the lateral portions of the edge groove 8 has such a configuration as to open toward the counter weight section 33. Therefore, since the groove bottom portion 80 of the edge groove 8 is open at both ends, the flow of the oil mist in the groove bottom portion 80 during operation can be accelerated, and, during stopping, the oil mist can be restrained from staying in the groove bottom portion 80, whereby it is possible to prevent the burning of the oil.

Further, since the two reinforcing ribs 81J, 81P constituting each of the lateral portions of the edge groove 8 are formed such that the crank pin section 31 side is lower in height than the crank journal section 30 side, the flow of the oil mist in the edge grooves 8 is allowed to access the crank pin section 31 more effectively.

Furthermore, the protruding ribs 35 are formed on the connecting portion 34 which connects the crank arm section 32 and the counter weight section 33, so as to extend in each of lateral directions when viewed in the direction of the crankshaft axis X indicated by the arrow A, and the interval between the distal ends 35a of the protruding ribs 35 is smaller in width than the interval between the extension lines E of the groove bottom portions 80 located on both lateral edges 32a of the crank arm section 32. Therefore, the crank arm section 32 can be reduced in weight and the balance between the weight reduction and the rigidity with respect to the crank arm section 32 can be optimized. In addition, the turbulence of the oil mist can be prevented thereby to improve the lubrication capacity.

While there has been described a preferred form of the present invention, it is not limited to the above embodiment, and various changes and modifications may be made in the invention without departing from the spirit and scope thereof.

For instance, the internal combustion engine in accordance with the present invention is not limited to the power unit of the embodiment which is provided with the primary transmission and the secondary transmission and which is mounted on the vehicle such as all terrain vehicle. Various types of internal combustion engines including a fixed type internal combustion engine may be adopted and the crankshaft described in the claims.

Further, while the structure around the crankshaft has been described according to the illustrated specific structure for the convenience of explanation, the present invention includes the structure of which the forward and backward sides are reversed, the orientation of the crankshaft itself is not limited based on the vehicle on which the crankshaft is mounted.

DESCRIPTION OF REFERENCE CHARACTERS

1: Power unit
2: Internal combustion engine
3: Crankshaft
8: Edge groove
20: Crank case
21: Crank chamber
25: Piston
26: Connecting rod
30: Crank journal section
30a: Base of crank journal section
31: Crank pin section
32: Crank arm section
32a: Lateral edge
33: Counter weight section
34: Connecting section
35: Protruding rib
35a: Distal end
80: Groove bottom portion
81J: Reinforcing rib on the side of the crank journal section 30
81P: Reinforcing rib on the side of the crank pin section 31
X: Crankshaft axis (Central axis of the crank journal section)
Y: Central axis of the crank pin section 31
C1: First crank part
C2: Second crank part
S1: First section
S2: Second section
A: Direction of crankshaft axis X (Direction of crankshaft in the present invention)
B: Direction to cross the crankshaft axis X (Direction to cross the crankshaft axis in the present invention)
E: Extension line of groove bottom portion 80
R: Rotational direction of the crankshaft 3

What is claimed is:

1. A crankshaft structure, comprising:
a crank pin section;
a crank journal section;
a counter weight section arranged between the crank pin section and the crank journal section in a direction of a crankshaft; and
a crank arm section connecting the crank pin section and the crank journal section is formed with each of lateral edge portions extending substantially along a circumscribed tangential line connecting a base of the crank pin section and a base of the crank journal section when viewed in a direction of the crankshaft, wherein each of the lateral edge portions of the crank arm section is provided with an edge groove having a length extending between a central axis of the crank pin section and a central axis of the crank journal section when viewed in a direction to cross the crankshaft, wherein the edge groove has a groove bottom portion, and a connecting portion of the crank arm section providing a connection between the crank journal section and the counter weight section is formed smaller in width than an interval between extension lines of the groove bottom portions located on each of the lateral edge portions of the crank arm section when viewed in the direction of the crankshaft.

2. A crankshaft structure according to claim 1, wherein the groove bottom portion is formed between a reinforcing rib on a side of the crank journal section and a reinforcing rib on a side of the crank pin section that constitute each of lateral portions of the edge groove and that open at least toward the central axis of the crank pin section.

3. A crankshaft structure according to claim 2, wherein the edge groove is formed such that a part of the edge groove located on a central axis side of the crank pin section is inclined to approach the crank pin section in relation to a part thereof located on a central axis side of the crank journal section, when viewed in the direction to cross the crankshaft.

4. A crankshaft structure according to claim 3, wherein each of the reinforcing ribs constituting each of the lateral portions of the edge groove has such a configuration as to open toward the counter weight section.

5. A crankshaft structure according to claim 4, wherein the reinforcing ribs constituting each of the lateral portions of the edge groove are formed such that the rib on the side of the crank pin section is lower in height than the rib on the side of the crank journal section.

6. A crankshaft structure according to claim 4, further comprising protruding ribs that are formed on the connecting portion to extend in each of lateral directions when viewed in the direction of the crankshaft, wherein an interval between distal ends of the protruding ribs is smaller in width than the interval between the extension lines of the groove bottom portions located on each of the lateral edges of the crank arm section.

7. A crankshaft structure according to claim 5, further comprising protruding ribs that are formed on the connecting portion to extend in each of lateral directions when viewed in the direction of the crankshaft, wherein an interval between distal ends of the protruding ribs is smaller in width than the interval between the extension lines of the groove bottom portions located on each of the lateral edges of the crank arm section.

* * * * *